UNITED STATES PATENT OFFICE.

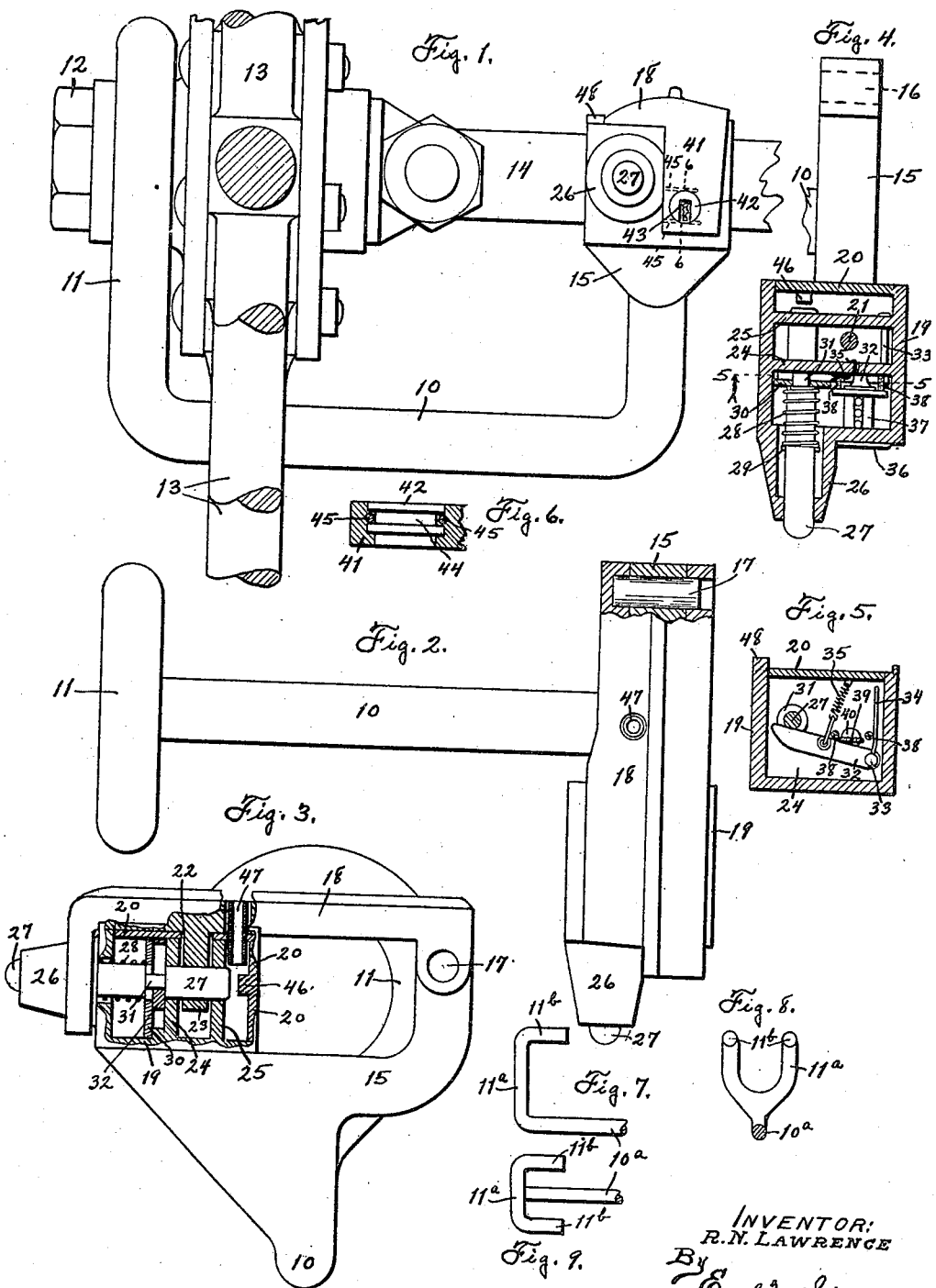

RICHARD N. LAWRENCE, OF ELDORA, IOWA, ASSIGNOR OF ONE-HALF TO BUTE IBACH, OF ELDORA, IOWA.

AUTOMOBILE-LOCK.

1,392,772.  Specification of Letters Patent.  Patented Oct. 4, 1921.

Application filed August 25, 1920. Serial No. 405,859.

*To all whom it may concern:*

Be it known that I, RICHARD N. LAWRENCE, a citizen of the United States of America, and resident of Eldora, Hardin county, Iowa, have invented a new and useful Automobile-Lock, of which the following is a specification.

The object of this invention is to provide an improved lock device for automobiles and similar vehicles.

A further object of this invention is to provide an improved automobile lock having a member adapted to be locked to an axle of the vehicle and having a member extending through the wheel and engaging the outer hub extension thereof, thus preventing rotation of the wheel and also preventing removal and substitution of the wheel.

A further object of this invention is to provide improved locking mechanism for holding a locking device in place securely and non-removably relative to a frame member.

A further object of this invention is to provide improved means for sounding an audible alarm in case of unauthorized tampering with the locking device.

A further object of this invention is to provide means to prevent drilling or other efforts to impair the lock mechanism.

With these and other objects in view, my invention consists in the construction, arrangement and combination of elements hereinafter set forth, pointed out in my claims and illustrated by the accompanying drawing, in which—

Figure 1 is a plan, partly in section, illustrating my improved lock device attached to a vehicle wheel and axle. Fig. 2 is an elevation of the device detached, shown in section through the pivot of the swinging latch. Fig. 3 is an end elevation of the device, the lock casing being shown in section to illustrate its contents. Fig. 4 is an elevation of the fixed member of the locking yoke, the swinging member being removed and the lock casing shown in section. Fig. 5 is a cross-section of the lock casing on the line 5—5 of Fig. 4. Fig. 6 is a cross-section through the upper flange of the swinging latch, on an enlarged scale, substantially on the line 6—6 of Fig. 1. Fig. 7 is a fragmentary side elevation, Fig. 8 a plan view and Fig. 9 an end elevation, partly in section, illustrating on a reduced scale a modified form of the member for engaging the hub extension of a vehicle wheel.

In the construction of the device as shown the numeral 10 designates a bar or arm of any suitable size and length, preferably formed of metal by casting or drop forging. The arm 10 is bent at right angles near one end and is formed with an integral eye 11 or loop adapted to engage over the hub extension 12 of a vehicle wheel, and lie in a plane parallel with and on the outside of the wheel. The arm 10 is adapted to be extended through the wheel, passing between spokes 13 thereof, in a position preferably in front of and parallel with a forward axle such as 14, although it is to be understood the device may be employed on a rear axle if desired. At its inner end the arm 10 is bent rearwardly at right angles and is formed with a vertically arranged yoke 15 embracing the axle 14. At its lower end the yoke 15 is formed with a transverse pivot hole 16 adapted to receive a hinge pin 17, by means of which a swinging latch 18 is pivoted to said yoke, said latch being forked at its lower end to embrace the lower end of said yoke. The hinge pin 17 preferably has its ends spaced from the outer surface of the forked portion of the latch, to prevent unauthorized removal of said pin. The latch member 18, when in closed and locking position, is adapted to extend vertically across the rear side of the axle 14 and close the space between the arms of the yoke 15, thus completely inclosing the axle between said members.

At its upper end the yoke 15 is formed integrally with a lock casing or box 19 of rectangular form, which box is formed open at its rear and bottom sides, the open sides being adapted to be closed by a cover plate 20 of L shape, held in place by a screw 21 passing through the rear side thereof and seated in the box or yoke 15. The rear side of the cover plate 20 is formed with an opening 22 through which a lug 23 formed on the inner or forward side of the latch member 18 is adapted to project within the box 19. The lug 23 of the latch projects between spaced horizontal partitions 24, 25, formed in the box 19 and is formed with a hole adapted to register with holes formed in said partitions. A boss 26 is formed on and projecting above the top of the box 19 and is formed with a bore registering with the holes in partitions 24, 25 and lug 23. A locking bolt 27 is mounted for reciprocation in the boss 26 and adapted to extend through the holes of the lugs 23 and partitions 24, 25, whereby the latch 18 is held in closed position as shown. A coil spring 28 is mounted on the bolt 27 within the box and at one end engages a pin 29 passing through said bolt and at the other end a plate 30 mounted in said box parallel with and slightly above the upper partition 24. It is the function of the spring 28 to tend to hold the bolt 27 outwardly unless locked in its innermost position as hereinafter described.

The locking bolt 27 is formed with a circumferential groove 31 between its ends and a locking lever 32 is suitably mounted within the box 19 and adapted to enter said groove and prevent outward movement of the bolt. As shown the locking lever 32 is mounted on the upper partition 24 and between said partition and the backing plate 30 and is fulcrumed at one end on a pin or screw 33 passed upwardly through both partitions and held by a cotter wire 34 extended through its upper end. A coil spring 35 is fixed at one end to the lever 32 and at the opposite end to the inside of the cover-plate 20, and serves to hold said lever normally toward the locking bolt to cause it to enter the groove 31 thereof, as plainly shown in Fig. 5.

A lock of any suitable type is mounted in the upper end of the box 19, and may be a Yale lock having an escutcheon plate 36 carried by the top of said box and a barrel 37 extending within the box and held in place by screws 38 passing through the partition 24. A flat cam member 39 is carried by and projects beyond the end of the rotating cylinder 40 of the lock, and said cam member extends past and adjacent to the latching lever 32. In one position, as shown in Fig. 5, the cam member lies substantially parallel with the adjacent long margin of the locking lever 32 and permits said lever to extend within the groove 31 of the locking bolt 27; but said cam member may be turned through an arc of about 90 degrees, by means of a key (not shown) fitted to the slot of the lock, and in such movement engage the locking lever and move it out of engagement with the locking bolt, thus permitting said bolt to move outwardly under the influence of the spring 28 to such extent that it clears the lug 23 of the swinging latch 18. This permits the latch 18 to be moved away from the axle 14, on the pivot 17, so that the device may be removed from the vehicle.

The latching member 18 preferably is formed at its upper end with an integral extension 41 adapted, when said latch is in closed position, to overlie the upper end of the box 19 and cover the escutcheon 36 of the lock. The extension 41 is formed with a circular hole adapted to register with the barrel 40 of the lock, and in said hole is mounted loosely a plug 42 (Fig. 6) having a slot 43 registering with the key-hole slot and permitting access of the key to the lock. As the plug 43 is loosely mounted and will rotate readily, it prevents boring of the lock by those wishing to tamper with the locking device. The plug 42 may be formed with a circumferential groove 44 to receive pins 45 mounted transversely through the extension 41, to prevent the plug falling from its hole when the latch 18 is swung away from the yoke.

A cap pin 46 is formed on the inside of the bottom member of the cover plate 20, immediately beneath the end of the locking bolt 27, and is adapted to receive an explosive cap of common form (not shown). In case of unauthorized tampering with the lock, as by hammering on the outer end of the bolt 27, the cap mounted on pin 46 is exploded, thus furnishing an alarm to frighten the thief and call attention to his operations. A tube 47 preferably is mounted through the back member of the cover plate 20, having its inner end adjacent the cap pin 46 and its outer end extended through a hole in the latch 18. It is the function of the tube 47 to permit escape of gases from the exploded cap and also to permit egress of the sound caused by such explosion.

In practical use the device is assembled as shown and described, and to be applied to a vehicle the arm 10 is first extended through one of the vehicle wheels, between spokes 13, and the eye or loop 11 caused to engage over the hub extension 12. The arm 10 is then moved inwardly as far as it will go and the yoke 15 placed adjacent the forward side of the axle 14 the latch 18 during such operation occupying substantially a horizontal position and extending rearwardly from the lower end of the yoke. Then the latch 18 is swung through an arc toward the axle until the lug 23 enters the box 19, after which the locking bolt 27 is depressed manually, against the spring 28, until the locking lever 32 enters the groove 31, whereupon the device is securely locked to the vehicle, and rotation of the wheel is prevented.

The parts of the device may be chilled or case hardened so that it cannot be drilled or cut with a hack saw to prevent removal of the lock without the proper key. The other features and precautions against tampering will be readily understood from the foregoing description. The wheel is securely locked to the axle so that it cannot be removed therefrom while the lock is in place, and the device provides a non-breakable and non-pickable locking means. When the latch 18 is in place in closed position it covers the screw 21 so that the cover plate 20 cannot be removed from the lock box, and the lock cannot be removed from said box except when the cover plate has been taken off.

It is to be understood that the device may be used either with or without the explosive cap device, which simply provides additional means to prevent tampering.

In Figs. 7, 8 and 9 is shown a modified form of means for engaging the hub extension 12, in which the arm 10ª is formed with a yoke 11ª at its outer end, in place of the closed eye 11. The ends of the arms of the yoke 11ª are turned inwardly to form prongs 11ᵇ adapted to pass back between spokes of the wheel.

The side of the box 19 is extended at 48 past the position occupied by the latch 18 in closed position, to prevent insertion of a tool between said latch and the box.

The arm 10 preferably is made square in cross-section if made by casting, or round in cross-section if formed by drop forging.

I claim as my invention—

1. The combination with the axle and wheel of a vehicle of a member adapted to be extended through said wheel and having an engaging portion on one end adapted to embrace the hub extension, means on the opposite end of said member for detachably engaging said axle, and means for locking the latter engaging means.

2. The combination with the axle and wheel of a vehicle, of an arm formed at one end with an eye adapted to engage the hub extension of a wheel, said arm adapted to be projected through said wheel and having at its opposite end a yoke adapted to engage said axle, a latch pivoted to said yoke and adapted to coöperate therewith in embracing said axle, and means for locking said latch to said yoke.

3. The combination with the axle and wheel of a vehicle, of an arm adapted to be extended through said wheel and formed at one end with means for embracing the hub extension thereof, said arm being formed at its opposite end with a yoke adapted to contact one side of said axle, a latch pivoted at one end to said yoke and adapted to engage the opposite side of said axle, a locking bolt mounted for reciprocation and adapted to lock said latch to said yoke at the opposite end, and a lock device adapted to prevent retraction of said locking bolt.

4. The combination with the wheel and axle of a vehicle, of an arm adapted to be extended through said wheel and formed at one end with a member for engaging the hub extension thereof, said arm being formed at its oposite end with a yoke adapted to engage one side of said axle, a latch pivoted at one end to said yoke and adapted to engage the other side of said axle, a locking bolt mounted for reciprocation and adapted to lock the opposite end of said latch to said yoke, said bolt being formed with a groove, a latching lever adapted to engage in said groove and prevent retraction of said bolt, and key-controlled means for releasing said lever.

5. The combination with the wheel and axle of a vehicle, of an arm adapted to be extended through said wheel and formed at one end with means for embracing the hub extension thereof, said arm being formed at its other end with a yoke adapted to engage one side of said axle, a latch pivoted at one end to said yoke and adapted to engage the other side of said axle, a spring-pressed locking bolt mounted for reciprocation and adapted to lock the opposite end of said latch to said yoke, said bolt being formed with a groove, a spring-pressed latching lever adapted to engage in said groove and prevent retraction of said bolt under the influence of its spring, and key-controlled means for releasing said lever.

6. The combination with the wheel and axle of a vehicle, of an arm adapted to be extended through said wheel and formed at one end with means for embracing the hub extension thereof, said arm being formed at its other end with a yoke adapted to engage one side of said axle, a latch pivoted at one end to said yoke and adapted to engage the other side of said axle, a locking bolt mounted for reciprocation and adapted to lock the other end of said latch to said yoke, key-controlled locking means for holding said bolt in locking position, and means contiguous to said bolt for carrying an explosive cap to sound an alarm in case of tampering with said bolt.

7. The combination with the wheel and axle of a vehicle, of an arm adapted to be extended through said wheel and formed at one end with means for engaging said wheel, said arm being formed at its opposite end with a yoke adapted to engage one side of said axle, a latch pivoted at one end to said yoke and adapted to engage the other side of said axle, said yoke being formed at its other end with a lock casing, said latch being formed between its ends with a lug adapted to enter said casing, a locking bolt mounted for reciprocation in said casing and adapted to pass through said lug, and key-controlled locking means in said casing for engaging said bolt.

8. The combination with the wheel and axle of a vehicle, of an arm adapted to be extended through and engage said wheel, said arm being formed at its inner end with a yoke adapted to engage one side of said axle, a latch pivoted to said yoke, said yoke being formed at one end with a lock casing, a lug on said latch adapted to enter said casing, a locking bolt mounted for reciprocation in said casing and adapted to pass through said lug, key-controlled locking means in said casing for engaging said bolt, said latch being formed with an extension adapted to overlie the outer end of said locking means, and a slotted plug loosely mounted in said extension and adapted to overlie and protect the outer end of said locking means.

9. In an automobile lock, a yoke, an arm adapted to engage a vehicle wheel, a latch pivoted on said yoke and adapted to coöperate therewith in embracing a vehicle axle, a lock casing on said yoke, said latch being formed with an apertured lug adapted to enter said casing, a locking bolt mounted for reciprocation in said casing and adapted to pass through said lug, a spring pressed lever adapted to engage said bolt; a key-operated lock having a rotatable member mounted in said casing, and a cam member on said rotatable member adapted to engage and release said lever.

Signed at Des Moines, in the county of Polk and State of Iowa, this 21st day of August, 1920.

RICHARD N. LAWRENCE.